United States Patent [19]

Cloos et al.

[11] 4,356,378

[45] Oct. 26, 1982

[54] APPARATUS FOR AUTOMATICALLY GUIDING A WELDING GUN ALONG A PROGRAMMED WELDING SEAM

[75] Inventors: Erwin Cloos, Haiger; Manfred Schmidt, Haiger-Allendorf; Helmut Kring, Haiger-Steinbach; Gerhard Schnell, Beilstein; Joachim Thielmann, Haiger-Rodenbach, all of Fed. Rep. of Germany

[73] Assignee: Carl Cloos Schweisstechnik GmbH, Haiger, Fed. Rep. of Germany

[21] Appl. No.: 72,530

[22] Filed: Sep. 4, 1979

[30] Foreign Application Priority Data

Nov. 25, 1978 [DE] Fed. Rep. of Germany ....... 2851063

[51] Int. Cl.$^3$ .............................................. B23K 9/12
[52] U.S. Cl. ............................. 219/124.1; 219/125.1; 228/32
[58] Field of Search ................. 219/86.25, 86.33, 86.7, 219/124.1, 124.22, 124.33, 125.1, 60.2, 125.11; 73/498; 228/25, 32

[56] References Cited

U.S. PATENT DOCUMENTS

| | | | |
|---|---|---|---|
| 1,929,537 | 10/1933 | Schweisthal | 73/498 |
| 2,908,804 | 10/1959 | Watter et al. | 219/86.33 |
| 3,373,914 | 3/1968 | Wall, Jr. | 219/124.22 X |
| 3,675,841 | 7/1972 | Gutlhuber et al. | 219/125.1 X |
| 4,008,384 | 2/1977 | Cecil | 219/124.33 X |
| 4,118,620 | 10/1978 | Wall, Jr. et al. | 219/124.22 X |
| 4,140,953 | 2/1979 | Dunne . | |
| 4,271,346 | 6/1981 | Hardy | 219/125.11 X |

FOREIGN PATENT DOCUMENTS

| | | | |
|---|---|---|---|
| 51-26314 | 8/1976 | Japan | 219/125.1 |
| 2717453 | 10/1978 | Fed. Rep. of Germany | 219/86.25 |
| 1382855 | 2/1975 | United Kingdom | 228/32 |

OTHER PUBLICATIONS

*Welding Journal,* vol. 58, No. 1, Jan. 1979, pp. 26–30; "Arc Welding Times Slashed by Robot at Airresearch" by William Hosier.

*Primary Examiner*—G. Z. Rubinson
*Assistant Examiner*—Keith E. George
*Attorney, Agent, or Firm*—Blanchard, Flynn, Thiel, Boutell & Tanis

[57] ABSTRACT

A welding robot having an elongated arm pivotally mounted on an upright turret which is movable about the upright axis thereof. As a result, the arm is swingable about the aforesaid upright axis. A fine movement control device or commuter is mounted on an end of the air remote from the aforesaid pivotal attachment thereof to the upright turret. The fine movement control device has a welding gun mounted thereon with structure being provided in the control device for permitting the welding gun to move through a very fine pattern of movement independent of the movement of the arm. A preprogram is provided for moving the arm in a predesignated direction to coincide with the path of a welding seam. Variations of the welding seam from the preprogram can be controlled by the structure in the fine movement control device so that the welding torch will follow the actual welding seam even if it varies from the preprogrammed path thereof.

11 Claims, 10 Drawing Figures

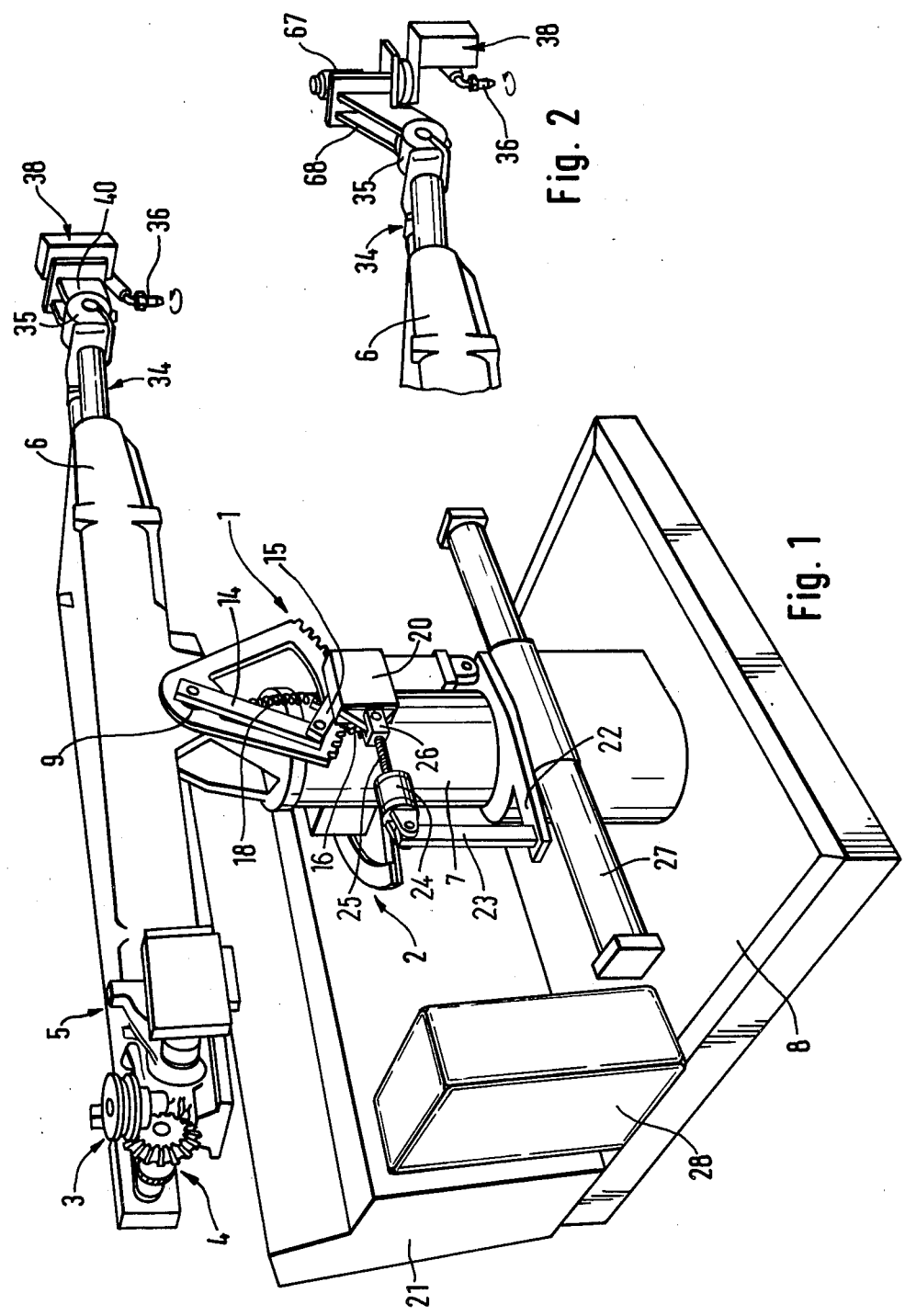

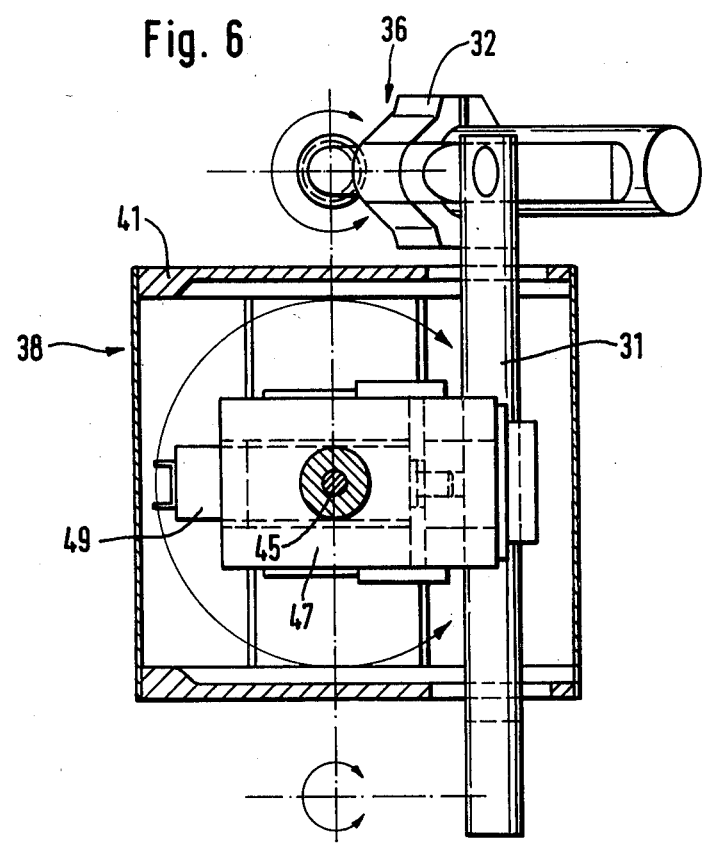

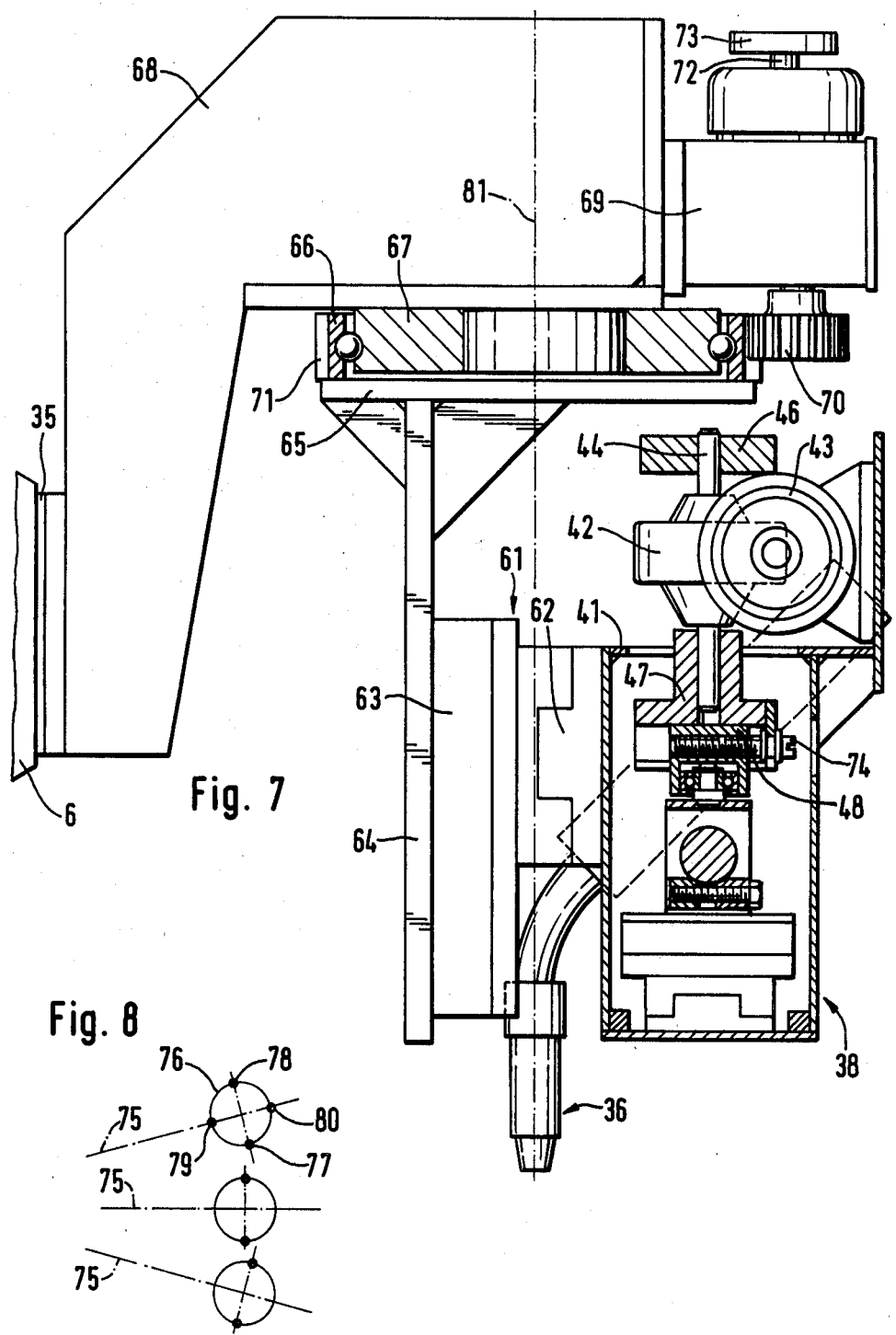

APPARATUS FOR AUTOMATICALLY GUIDING A WELDING GUN ALONG A PROGRAMMED WELDING SEAM

FIELD OF THE INVENTION

The invention relates to an apparatus for automatically guiding a welding gun according to a program (welding robot), which characterizes the respectively desired welding seam, comprising an arm which is pivotal about two axes which are perpendicular to one another and is adjustable in length, a mounting member for facilitating a fastening of a welding gun thereto, which mounting member is mounted at the free end of the arm and is adjustable in at least two planes which are penpendicular to one another, and decoders for measuring the movements of the axles of the mentioned parts and for transmitting the measured values to a control device which belongs to the apparatus.

BACKGROUND OF THE INVENTION

Welding robots are primarily used when constantly repetitive welding seams are to be welded, when constantly uniform welding seams are to be manufactured with a high degree of exactness, or when the quality of the welding seams is to be detected during welding, so that if differing welding data occur, the respective welding point can later be detected and examined, and primarily when inhumane working conditions exist, for example when the welding piece is preheated to high temperatures.

The welding robots are initially programmed for the respective welding piece, namely the welding coordinates of the welding seams are detected and stored in the control device of the welding robot. The position of the welding gun, namely the position of the axes of the robot, are reported back through decoders, which are coupled with the individual axes of the welding robot. To transmit the movements onto the decoders, chains and sprockets are used. These elements do not achieve a great degree of exactness in the transmission particularly when reversing operation occurs. Moreover, the chains are not clearance-free and clearance increases with the wear of the chains. The clearance is particularly noticeable in the present case, since small movements of the axes must be transformed into large movements so that the steps which are detectable with the decoder become sufficiently small. The result is that the positions are no longer approached exactly, so that the welding seam is generated besides the originally programmed one. Furthermore, it is a problem to fill out welding seams with the known welding robots and to carry out welding operations when the workpieces to be welded have greater tolerances, namely when the actually existing welding seam of one or the other workpiece differs appreciably from the programmed welding seam.

The basic purpose of the invention is to construct a welding robot of the above-mentioned type is such a manner that 1. a one-time programmed welding seam with a high degree of reproducible precision can be created as often as desired,
2. a seam filling with the welding robot is possible and
3. also large tolerances in the welding seam of the workpiece to be welded can be evened out automatically by the welding robot.

To avoid the inexactnesses which occur in the conventional welding robots through the connection of the decoders, it is suggested according to the invention that at least the transfer of the magntiude of the angle of traverse of the arm onto the decoders occurs through tooth elements (gears, tooth segments, toothed rims) and that each one of the cooperating tooth elements of one pair of elements is supported swingably or movably and is urged by a spring into engagement with the teeth of the other one.

In order for the welding robot to be able to balance out greater tolerances in the workpiece to be welded and to be suitable for filling up welding seams, it is further inventively suggested that a commuter of fine movement control device which carries the welding gun is fastened to the mounting member of the arm, which commuter has a cross slide, of which each externalmost carriage is connected either to the housing or rotatably to one end of an axle, the other end of which rotatably engages a sliding block, which is adjustable perpendicularly with respect to the axis of the axle, wherein the guide bar which receives the slide block is driven by a motor, the drive axis of which extends parallel to the axle which connects the cross slide to the slide block, and wherein the welding gun is fastened to the slide block or to the carriage which is opposite said slide block. The commuter gives the welding gun a rotary movement, the circle diameter of which can be adjusted with the aid of the slide block. The adjustability of the diameter is given from a maximum value to zero, so that the commuter does not need to be removed, in case a rotary movement of the welding gun is not desired.

According to a further preferable embodiment of the invention, a decoder is coupled with the drive shaft of the motor for the welding gun, which decoder facilitates a detection of the respective position of the welding gun relative to the path of the welding seam. The positions which are important for the control of the welding guns are the two positions in which the welding gun is above the center of the seam and the two other positions in which the welding gun is in a position of 90° offset with respect to the line defining the welding seam. The welding gun has in this position the maximum distance from the center of the weld. If one detects the welding values (welding current or welding voltage), when the welding gun is in its zero position, namely is above the center of the weld, then one can regulate the height of the welding gun above the workpiece with reference to a desired-actual-value comparison. If for example the welding current compared with the desired value is too low, then the welding gun is driven toward the workpiece until the desired value is reached. It is preferable not to adjust the welding gun during each zero-passage, but to detect a certain number of zero-passages and to carry out the adjustment with reference to the obtained medium value. If the welded seam has side tolerances, namely if same does not conform to the programmed welding seam, then the welding gun can be returned into the zero-position by comparing the welding-actual values on both sides of the welded seam. One can, for example, form the difference of the two obtained actual values and can carry out the movement in the one or other direction until the difference has become zero. The necessary side or height correction of the welding gun can take place directly through the control device of the welding robot. This requires, however, a significant control expenditure. In order to reduce this expenditure, it is furthermore inventively suggested to movably arrange the decoders for detecting the position of the axles of the welding robot. By moving one or several decoders which scan the axles of the welding robot, the same effect is achieved as if the welding seam, which is programmed in the control unit of the robot, would have been newly programmed with reference to the obtained actual values. The movement of the decoders occurs preferably through stepping motors, so that a reproducible adjustment is assured.

According to a further suggestion of the invention, the housing of the commuter is fastened to a cross undercarriage, which in turn is fastened to the mounting member of the robot and is aligned and constructed such that a movement of the welding gun parallel and perpendicular with respect to the welding wire which exits from the current nozzle can take place. With the aid of this cross undercarriage, there simultaneously occurs a correction of the position of the welding gun to a given welding seam tolerance without necessitating the program of the welding robot to be changed for the control of the welding gun. In using a cross undercarriage, the decoders can be connected fixedly with the axes of the welding root.

According to a further exemplary embodiment of the invention, the commuter or the cross undercarriage is secured to a rotary unit, the axis of rotation of which is arranged axially with respect to the current nozzle opening of the welding gun. As a result, it is possible to rotate the welding torch such that the welding gun extends always perpendicular with respect to the welding seam and the circular movement of the correction carriage is always moved into the correct position with respect to the welding seam contour. A tilting of the welding gun with respect to the welding seam is thus avoided.

BRIEF DESCRIPTION OF THE DRAWINGS

Several exemplary embodiments of the invention will be described more in detail hereinafter with reference to the drawings, in which:

FIG. 1 is a perspective view of an inventively constructed welding robot;

FIG. 2 illustrates a further embodiment of a commuter unit on the arm;

FIG. 6 is a cross-sectional view taken along the line VI—VI of FIG. 5;

FIG. 7 is a longitudinal cross-sectional view of a further embodiment of a commuter having a rotary unit and a cross undercarriage according to the invention;

FIG. 8 illustrates the path of movement of the tip of the welding gun over the welding seam;

DETAILED DESCRIPTION

Figure 3:
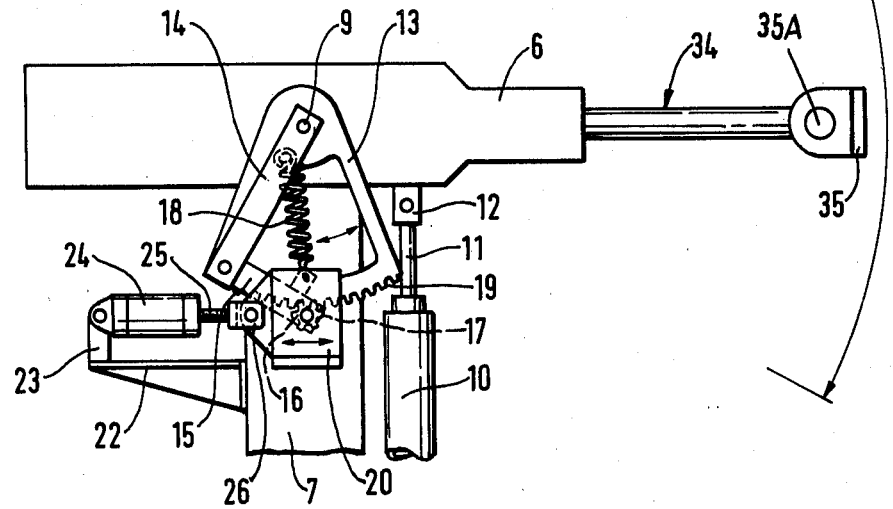
FIG. 3 is a side view of the arm with an attached decoder in an enlarged scale.

A welding robot embodying the invention is illustrated in FIG. 1 and consists substantially of an arm 6, a column 7 and a base plate 8 which carries the column and which also receives the attachments for the robot. The arm 6 is, as is illustrated also in FIGS. 3 and 4, pivotal about an axle 9 which is positioned on the column 7. A hydraulic cylinder 10 having a piston rod 11 is used for the drive of the robot about the axis of the robot. The piston rod 11 is pivotally coupled to a bearing yoke 12 on the arm 6. An arcuate gear segment 13 which is fixedly connected to the arm 6 is positioned rotatably on the axle 9. A flat bar 14 is fixedly connected at one end to the axle 9. One end of a lever arm 15 is pivotally connected to the other free end of said flat bar. A gear 16 is fixedly connected to the other free end of the lever arm 15, the teeth 17 of which gear are urged by a tension spring 18 into engagement with the teeth 19 on the arcuate gear segment 13. The teeth 17 and 19 are preferably constructed as involute teeth, so that any type of play between the teeth 17 and 19 can be prevented by the spring 18.

A decoder is identified by the reference numeral 20, which decoder measures the respective angle of traverse of the arm 6 and forwards the measured values to a control device which is stored in a console 21. The control device compares the measured values with the respective preprogrammed values and effects a control of the drive elements, in this case, a control of the cylinder 10.

An angle iron 22 is secured to the column 7 of the robot and has an upstanding arm 23 adjacent the free end thereof, to which arm is pivotally fastened a stepping motor 24. The stepping motor 24 rotatably drives a threaded spindle 25, which is threadedly coupled to a nut secured to a bearing yoke 26 pivotally secured to the housing of the decoder 20. The decoder 20 is carried by the two lever arms 14 and 15 and is pivotally secured to the lever arm 15 at the axle for the gear 16. Thus, by moving the decoder 20 through a rotation of the spindle 25, the decoder will move through positions controlled alone by the lever arms 14 and 15. The gear 16 will, in all positions of the decoder, be in engagement with the teeth 19 on the arcuate segment. With the aid of the stepping motor 24 the position of the decoder 20 can be changed relative to the arcuate gear segment 13, without causing a movement of the arcuate gear segment 13, namely a pivoting of the arm 6 about its axle 9. Thus it is possible with the aid of the stepping motor 24 to carry out corrections in a simple manner, which corrections become necessary due to variations in the path of the welding seams on the workpiece, without requiring a change in the preprogrammed work program.

The measuring points of the robot, at which the swivel motions about its axle are read, are identified by the reference numerals 1 to 5 in FIGS. 1 and 2. All measuring points are constructed according to the same principle.

The pivoting of the arm 6 about the axis of the column 7 occurs with the aid of a double acting hydraulic cylinder 27, which is supplied with pressurized oil from a hydraulic power unit 28.

Figure 4:
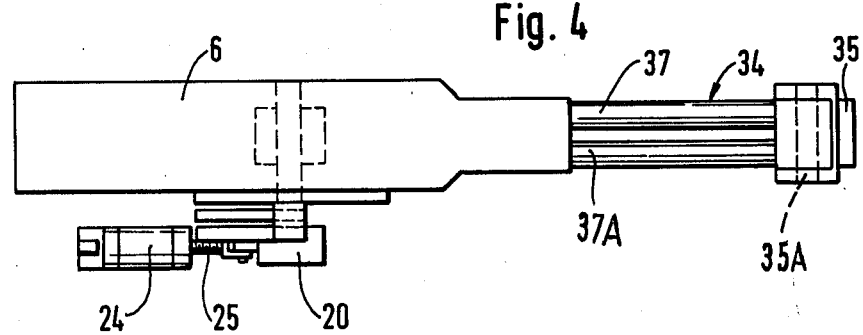
FIG. 4 is a top view of FIG. 3.

As FIGS. 3 and 4 schematically illustrate, the arm 6 has a longitudinally movable part 34, at the free end of which is secured a mounting member 35 to facilitate the fastening of a welding gun 36 thereto. The part 34 facilitates a change in the length of the arm 6. The respectively controlled length is to be precisely determined by a further decoder and is to be transmitted to the control device. The further decoder is constructed and fastened similarly, as the decoder 20. The longitudinal movement of the part 34 is for this purpose changed in a conventional manner into a rotary movement. The part 34 consists of two hollow pipes 37 and 37A and two rods (not illustrated), which are telescopically movable in the pipes, however, are connected fixed against rotation within said pipes. The mounting member 35 which receives the welding gun thereon is additionally pivotally supported through an axle 35A which extends perpendicularly with respect to the longitudinal axis of the part 34. As a result of the additional axle 35A, which extends parallel with respect to the axis of the axle 9, the inclination of the welding gun with respect to the welding piece can be adjusted easier and more precisely than with the axle 9.

Figure 5:
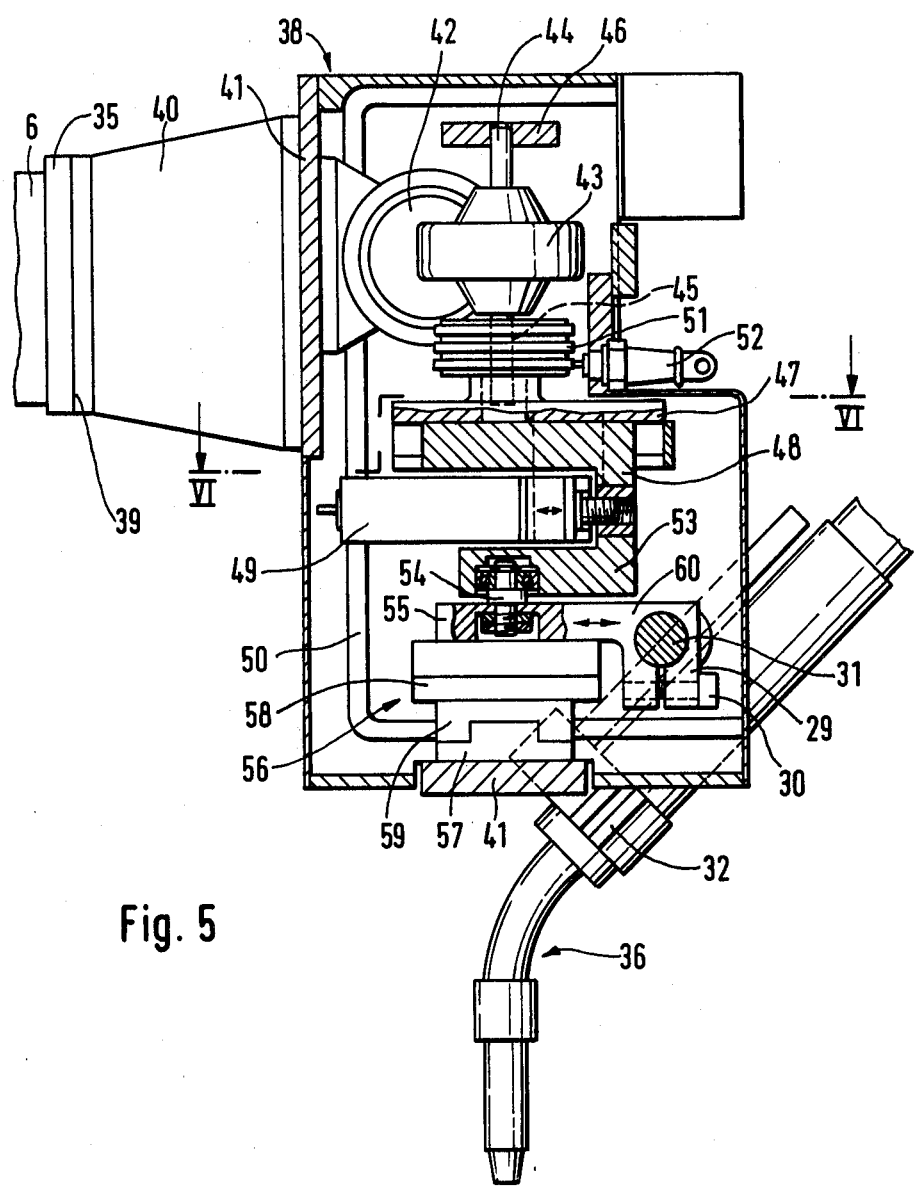
FIG. 5 is a cross-sectional view of a commuter according to the invention.

A commuter or fine movement control device 38 which carries the welding gun 36 is fastened to the mounting member 35, as is illustrated in an enlarged scale in FIG. 5. The mounting member 35 has a mounting surface 39, to which is secured one end of a fastening element 40, the other end of which is connected to the housing 41 of the commuter 38. The commuter 38 causes the welding gun 36 to undergo a circular movement, as is illustrated in FIG. 8.

A motor 42 having a gearing arrangement 43 operatively coupled thereto is fastened inside of the housing 41, which gearing has two driven shafts 44, 45. A decoder 46 is fastened to the upper driven shaft 44, the function of which decoder will be discussed below. A guide bar 47 is fastened to the lower driven shaft 45, in which guide bar a slide block 48 is movably supported. The slide block 48 is moved with the aid of a servomotor 49 fastened to the guide bar 47. A current supply to the motor 49 is provided through slip rings 51 and current supply terminals 52, of which only one is illustrated in FIG. 5. The slide block 48 is constructed in a U shape. The upper end of an axle 54 is rotatably fastened to the lower part 53 of the slide block 48, the other end of the axle being fixedly fastened to an uppermost carriage 55 of a cross slide arrangement identified as a whole by the reference numeral 56. A lowermost guide member 57 of the cross slide arrangement 56 is fixedly connected to the housing 41. The two central carriages 58, 59 of the cross slide arrangement are fixedly connected to one another. The carriage 55 is movable with respect to the carriage 58, 59 in the plane of the drawing of FIG. 5 and the carriage 58, 59 is movable in a plane perpendicular to the plane of the drawing of FIG. 5.

An arm 60 is fastened to the carriage 55 and has a circular clamp 29 and a screw 30 therein. The clamp 29 receives an arm 31 to which is fastened the welding gun. The welding gun 36 is fastened to the arm 31 with the aid of a clamp 32 (FIG. 6).

By adjusting the position of the slide block 48 in the guide bar 47, the axle 54 is moved in a parallel relationship toward and away from the axis of the driven shaft 45 of the motor 42, so that the welding gun is moved in a circle of a variable radius. If the axle 54 and the driven shaft 45 of the motor 42 are in alignment, then the circle is reduced to a point.

The exemplary embodiment which is illustrated in FIG. 7 differs from the one illustrated in FIG. 5 substantially by the commuter 38 not being directly fastened to the fastening element 40 and to the mounting member 35, but to a cross undercarriage 61 arranged between the commuter 38 and the mounting member 35. The cross undercarriage 61 has a carriage 62 which is connected to the housing 41 and a carriage 63 connected to a downwardly extending arm 64. The arm 64 is connected to a plate 65, which is fastened to the outer ball bearing ring 66 of a ball bearing structure 67. The ball bearing structure 67 is fastened to a bracket 68. Furthermore a gear motor 69 is fastened to the bracket 68, the driven pinion 70 of which mates with a toothed rim 71 on the outer ball bearing ring 66. A transmitter 73 is connected to the shaft 72 of the motor 69, with the aid of which transmitter the angular position of the welding gun 36 in its circular path of movement relative to the bracket 68 and thus relative to the mounting member 35 is determined.

The slide block 48 in the guide bar 47 is adjusted in contrast to the exemplary embodiment according to FIG. 5 not by a servo-motor but by an adjusting screw 74. The slide block 48 will be adjusted by an adjusting screw always when a return of the welding gun into the zero position during the welding is not needed. The cross undercarriage 61, which facilitates an adjustment of the welding gun in two planes which are perpendicular to one another, is used to adjust the height and lateral movement of the welding gun independent of the course of movement of the welding robot, which is fixedly determined through the programming. This assures that the welding robot can weld perfectly also welding seams, which differ from the programmed welding seam. The welding torch automatically follows the welding seam, particularly in response to a device which scans the welding joint. This scanning can be done in the simplest manner by mechanical means, however, the actual values of for example the welding-arc voltage or of the welding current are compared preferably with the desired values and in relationship to the differences in the position of the welding torch until the desired value corresponds with the actual value.

The welding seam direction is identified in FIG. 8 by the reference numeral 75 and the circular pendulous movement of the torch is identified by the reference numeral 76. For a correction of the position of the welding torch with the aid of the cross undercarriage 61 the actual current, for example, is interrogated. These points must always lie vertically with respect to the welding seam direction, so that the respective maximum distance of the welding torch with respect to the welding seam is detected. If the two actual values are the same, then the two points 79 and 80 lie above the center of the welding seam. If a difference of the actual values occurs, then the values 79 and 80 are shifted relative to the welding seam. In this case, the cross undercarriage is moved until the actual values are equal at the points 77 and 78. When the welding torch moves through the points 79 and 80, the actual value, for example of the welding current, is also detected and is compared to a pregiven desired value. If the actual value is too high, then the cross undercarriage 63 is also moved until the actual value corresponds with the desired value. The measurement for the height correction of the welding gun takes place at the points 79 and 80 and measurement for side correction occurs at the points 77 and 78. The points 76 to 80 are determined by the decoder 44. During an inclination of the welding seam 75 in comparison with the central position, the points 77 and 78 would, if no correction is carried out, no longer have the greatest distance from the welding seam 75, so that the measuring result would be changed. In a border case, it could occur that the actual values for side scanning are determined through the center of the welding seam and the actual values for the height scanning laterally of the welding seam. To prevent this, the commuter is rotatably fastened, wherein the axis of rotation of the rotary unit goes through the opening of the current nozzle of the welding gun. It is achieved through this that the welding gun is always moved to a certain point with respect to the welding seam. The movement of the commuter about the axis 81, namely the position of the welding gun relative to the welding seam 75 is determined by the decoder 73. The absolute position of the rotary unit is detected during the initial programming of the welding seam.

Figure 9:
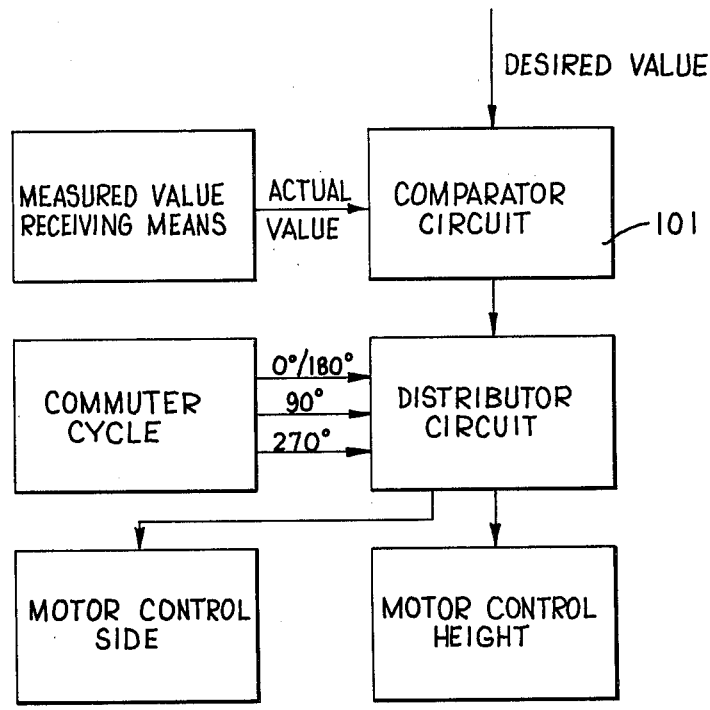
FIG. 9 is a block diagram of a circuit for controlling the position of the welding gun.

Referring to FIG. 9, and assuming the actual value of the welding current is detected, the actual value of the current is compared to a desired value thereof in a comparator circuit 101. The actual value is determined by a measured value receiving means of any convenient type, such as the type disclosed in U.S. Pat. No. 3,697,403 for sensing grinding current in an electrochemical grinding apparatus. The comparator circuit 101 determines the differential between the desired and actual values and feeds a corresponding output to a distributor circuit which, depending on the commuter cycle, namely, whether it is at a 0°, 90°, 180° or 270° position relative to a reference location, effects a movement of the welding gun toward the side or vertically.

Figure 10:
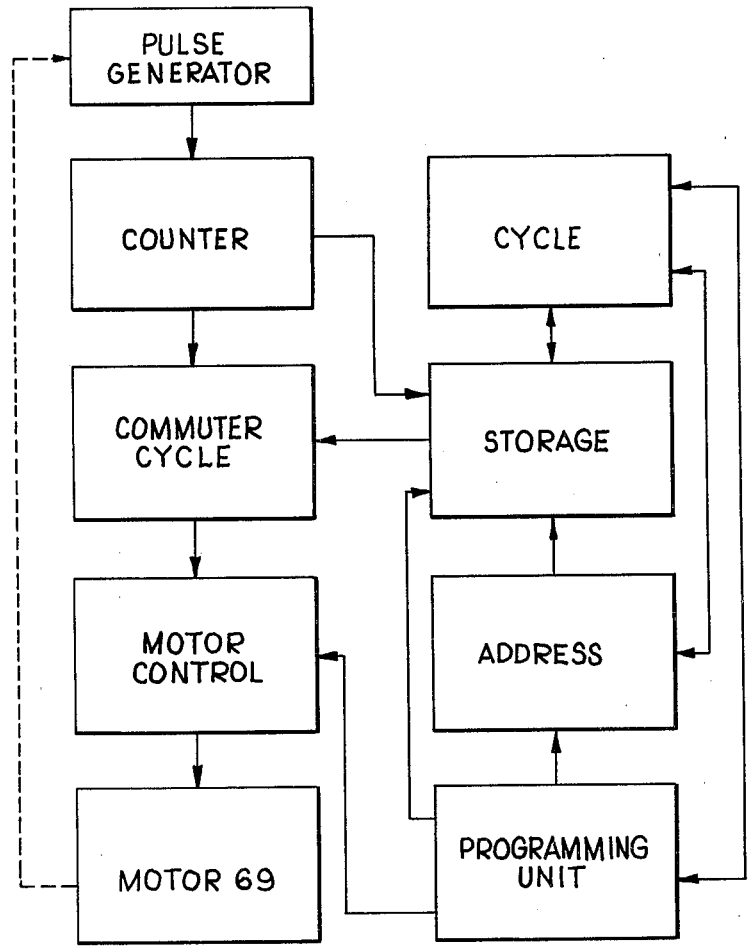
FIG. 10 is a further block diagram of a circuit for controlling the position of the welding gun using a programming unit.

FIG. 10 illustrates a circuit for enabling the welding gun to follow the weld seam based on a preprogrammed control. The diagram of FIG. 10 is believed self-explanatory to those skilled in the art so that further discussion is believed unnecessary.

If an inventively suggested rotary unit would not be provided, then the control of the robot would have to change the interrogation points for the decoder 44 corresponding with the direction of the welding seam. However, this means the provision of an expensive circuit.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A welding robot, comprising:
a base;
an arm mounted on said base for pivotal movement about mutually perpendicular axes;
adjustment means for effecting a variance of the length of said arm at one end thereof;
a first decoder means for measuring the angle of traverse of said arm about one of said mutually perpendicular axes;
mounting means on said one end of said arm;
commuter means mounted on said mounting means, said commuter means including welding gun means and support means supporting said welding gun means for movement in two mutually perpendicular planes separate from planes defined by the movement of said arm about said mutually perpendicular axes, said commuter means including a housing, a drive motor mounted on said housing, a first axle rotatably supported on said housing and driven by said drive motor, a guide bar secured to said first axle for movement therewith, a slide block slidably secured to said guide bar and having means thereon defining a second block axle extending parallel to said first axle, said support means including a cross-slide member having first and second carriages, said first carriage being fixedly mounted on said second axle, said second carriage being mounted for relative movement between said first carriage and said housing, said welding gun means further including a welding gun secured to and movable with said first carriage; and
a second decoder means for measuring the angle of traverse of said first axle relative to said housing.

2. The welding robot according to claim 1, wherein a servo-motor is provided between said slide block and said housing for facilitating a relative adjustment therebetween.

3. The welding robot according to claim 1, wherein current supply slip rings are provided for supplying current to said servo-motor.

4. The welding robot according to claim 1, wherein the output speed of said drive motor is variable.

5. The welding robot according to claim 1, wherein said second decoder means is coupled to said first axle.

6. The welding robot according to claim 1, wherein said commuter means includes a cross undercarriage secured to said mounting means, wherein said housing is secured to said cross undercarriage.

7. The welding robot according to claim 6, wherein said cross undercarriage includes a rotary support therefor, the axis of rotation of which is arranged coaxially with respect to the axis of a current nozzle opening of said welding gun.

8. The welding robot according to claim 1, wherein said first and second decoder means are movable relative to the axes with which they are associated.

9. The welding robot according to claim 8, wherein a stepping motor is provided for effecting a movement of each of said first and second decoder means.

10. The welding robot according to claim 1, wherein said first decoder means includes toothed elements and wherein said toothed elements have an involute tooth system.

11. The welding robot according to claim 10, wherein said toothed elements include a toothed segment connected fixedly to said arm and a link connected fixedly to one of said pivot axles of said arm, wherein a lever arm having a gear thereon is urged by a spring into meshing engagement with the teeth of said toothed segment, said lever arm being hinged to the free end of said link.

* * * * *